(12) United States Patent
Provence et al.

(10) Patent No.: US 6,416,226 B1
(45) Date of Patent: Jul. 9, 2002

(54) PRELOADED CUSHIONED BEARING ASSEMBLY

(75) Inventors: Marc Provence; Phillipe Bariod, both of Annecy (FR)

(73) Assignee: Glacier Garlock Bearings, Inc., Wilmington, DE (US)

( * ) Notice: Subject to any disclaimer, the term of this patent is extended or adjusted under 35 U.S.C. 154(b) by 0 days.

(21) Appl. No.: 09/581,281
(22) PCT Filed: Dec. 10, 1998
(86) PCT No.: PCT/EP98/08029
§ 371 (c)(1),
(2), (4) Date: Jun. 9, 2000
(87) PCT Pub. No.: WO99/30047
PCT Pub. Date: Jun. 17, 1999

(30) Foreign Application Priority Data

Dec. 11, 1997 (GB) ............................................. 9726099

(51) Int. Cl.⁷ ............................................. F16C 17/02
(52) U.S. Cl. ....................................... 384/220; 384/222
(58) Field of Search ................................ 384/220, 222, 384/536, 582, 221

(56) References Cited

U.S. PATENT DOCUMENTS 3,188,152 A    6/1965    Miller

FOREIGN PATENT DOCUMENTS

| DE | G9216981 | 4/1993 |
|----|----------|--------|
| FR | 1375550  | 9/1964 |
| FR | 2426829  | 12/1979 |
| FR | 2466663  | 4/1981 |
| FR | 2526899  | 11/1983 |
| FR | 2708975  | 2/1995 |
| GB | 0805538  | 12/1958 |
| GB | 1491133  | 11/1977 |
| GB | 1534425  | 12/1978 |
| GB | 2273135  | 6/1994 |

OTHER PUBLICATIONS

English Translations of DE G9216981, FR2426829, FR2466663 and English abstract of FR137550 Derwent English abstracts of FR2526899, FR2708975 (see patents for dates).

Primary Examiner—Lenard A. Footland
(74) Attorney, Agent, or Firm—John M. Harrington; Kilpatrick Stockton LLP

(57) ABSTRACT

In a bearing assembly for a steering column assembly for example, the bearing assembly comprising an axially split bearing and elastomeric crown, the crown acting to close the split, there is disclosed an improved elastomeric crown. The crown includes a plurality of passageway extending through the crown. The crown also includes a plurality of ribs extending outwardly of the crown. The improved elastomeric crown allows more constant pressure fields and low torque variations of a shaft running in the bearing.

20 Claims, 4 Drawing Sheets

PRELOADED CUSHIONED BEARING ASSEMBLY

The present invention relates to an improved bearing assembly having primary, though not exclusive use, as a bearing assembly for steering columns for use in automotive vehicles, and to an elastomeric crown for use in such a bearing assembly.

A steering column includes all the elements necessary to enable motions of a steering wheel to be transmitted to a steering rack. The steering column includes a mounting tube in which a shaft, linking together the steering wheel and the steering rack, is guided in rotation. The shaft is supported in the tube by a plurality of bearing assemblies.

When used in steering columns, bearing assemblies must satisfy a number of conditions. Vehicle manufacturers specify the mounting, speed and temperature conditions at which the bearing assemblies will need to operate. The bearing assemblies must allow stresses from the steering wheel to be transmitted via the shaft and must run silently. Further, the bearing assemblies must maintain their properties throughout the working life of the steering column despite the various environmental factors encountered, including changing levels of temperature, humidity and grease.

It is known to construct bearing assemblies for this purpose comprising a split bearing, about which is located an elastic element, the elastic element in use being located between the bearing and a mounting tube to locate the bearing axially in relation to the mounting tube. In this way a continuous pressure may be maintained on the rear surface of the bearing acting to close the split.

However, in known bearing assemblies, such as those described above, the force exerted on the rear surface of the bearing will follow the intrinsic physical characteristics of the elastic element. In addition the force exerted will be affected by any irregularities on the inside surface of the housing. These characteristics can cause problems in obtaining and maintaining an even, or substantially even, force on the rear surface of the bearing. There is a need for an elastic element to have a substantially constant pressure on the rear surface of the bearing in order to guarantee the constancy of the rotating torque value. It would be an advantage for the substantially constant pressure to be at the minimum required to do this. This is because, unfortunately, in some circumstances, maintaining the substantially constant pressure on the rear surface of the bearing against the opposing force exerted by the bearing will cause creep bending to occur in the elastic element. Clearly, it would be an advantage to have the lowest stress level in the elastic element to avoid creep bending occurring.

It is an advantage of the present invention that an elastomeric crown according to the present invention eliminates or substantially reduces these problems.

According to a first aspect of the present invention, we provide an elastomeric crown for a bearing assembly comprising an elastomeric cylinder having an annular wall about a longitudinal axis, a plurality of passageways extending longitudinally through the cylinder wall and a plurality of ribs extending along an outer surface of the elastomeric cylinder.

Preferably the passageways extend parallel to the longitudinal axis of the elastomeric element.

The cross sectional shape of the passageways may be any desired and may include round, oval, hexagonal for example.

The elastomeric element is provided with a plurality of ribs extending along an outer surface of the elastomeric element.

More preferably the plurality of ribs extend substantially parallel to the longitudinal axis of the elastomeric cylinder.

More preferably the plurality of ribs are located radially of the passageways extending through the elastomeric element.

The cross sectional shape of the ribs may be any desired shape.

Preferably at least one of the plurality of ribs comprises a bead extending longitudinally along the elastomeric cylinder projecting from an outer surface of the elastomeric cylinder, the outer surface of the bead being a flat disposed parallel to a tangent of the outer surface of the elastomeric cylinder.

Preferably the plurality of passageways comprises twelve passageways.

According to a second aspect of the invention, we provide a bearing assembly comprising a cylindrical bearing having an axial split and an elastomeric crown according to the first aspect of the invention, the elastomeric crown being located about the split bearing.

Although the bearing assembly of the present invention is described with particular reference to steering columns for vehicles as an example of its use, the bearing assembly according to the present invention is effectively a "clearance-free bearing assembly" where the bearing runs against a co-operating shaft without clearance due to the radially compressive force due to the crown. Thus, the bearing assembly of the present invention has many applications other than in steering columns.

According to a third aspect of the present invention, we provide a steering column assembly including at least one bearing assembly according to the second aspect of the invention.

The invention will now be described, by way of example only, with reference to the accompanying drawings, in which.

Figure 1:
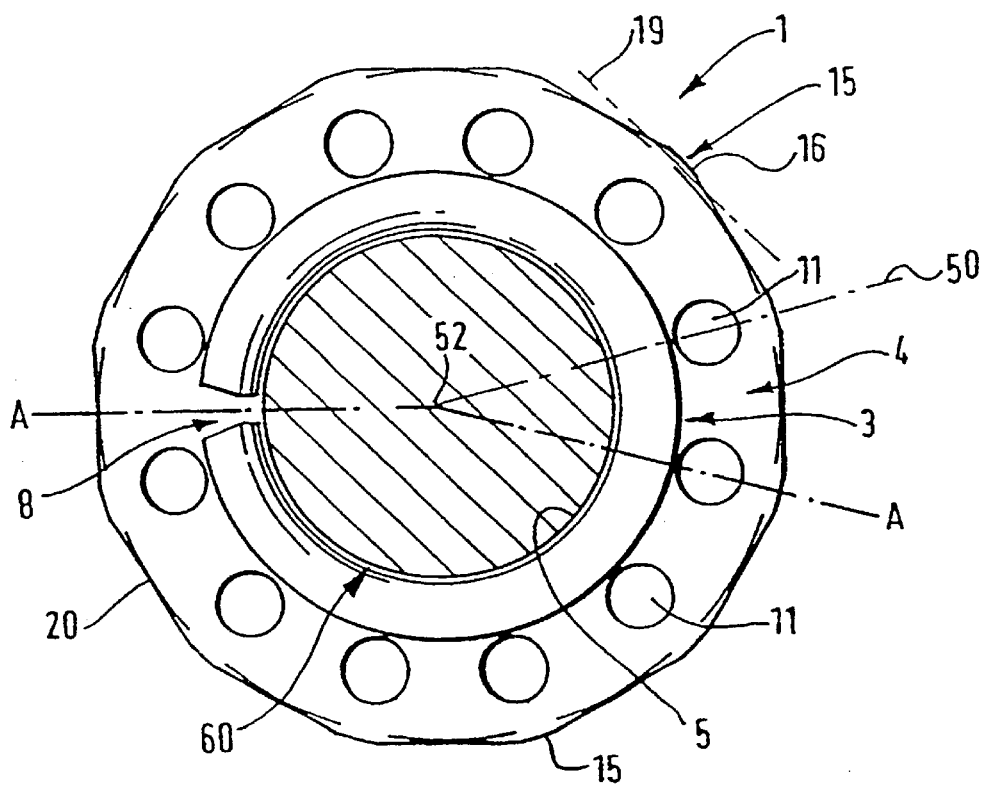
FIG. 1 shows a view parallel to the axis of a bearing assembly according to the present invention.
Figure 2:
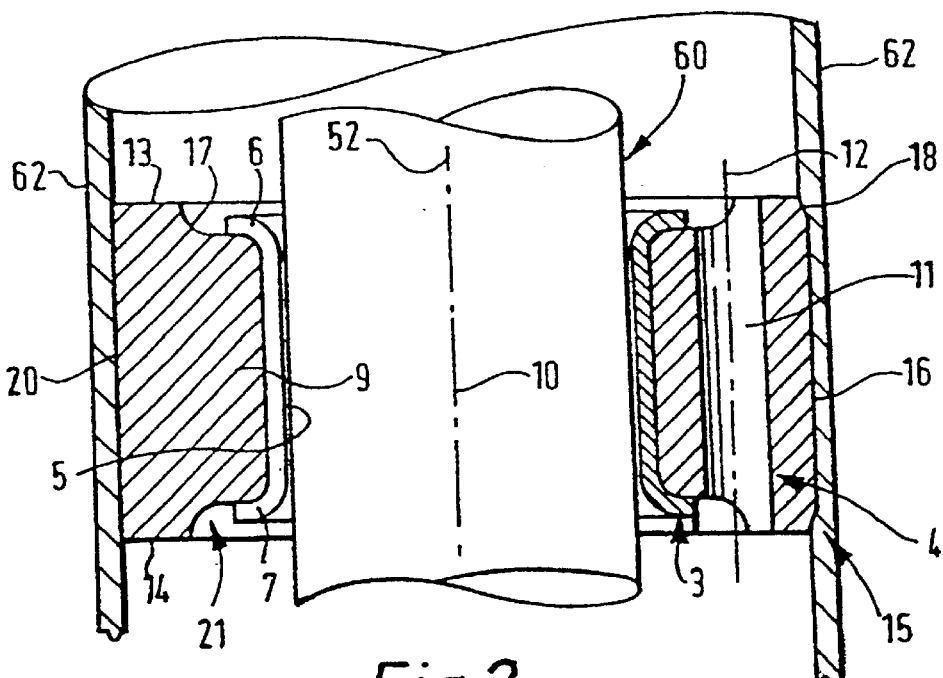
FIG. 2 shows a section of the bearing assembly along line A—A of FIG. 1.

Referring first to FIGS. 1 and 2, there is shown a first embodiment of the present invention. A bearing assembly 1 is shown for locating a shaft 60 in a housing 62 (the shaft 60 and housing 62 are shown only in part in FIG. 2). The bearing assembly comprises a split bearing 3 bush and elastomeric crown 4. Typically, the bearing is manufactured from steel strip. An inner surface 5 of the bearing 3 is lined with an anti-friction material, typically a polymer with a low surface hardness, for example PTFE, polyacetal or PEEK. The lining is able to run dry or partially lubricated.

In its free spread state the bearing has an axial split 8 which under pressure may be closed. The peripheral length of the bearing is such that when the axial split is closed, the internal diameter of the bearing is less that the external diameter of the shaft. In use, the shaft 60 is inserted into the bearing pushing the bearing outwards. At the same time the elastomeric crown between the bearing and the housing is compressed, acting to push the bearing 3 back towards the shaft. In this way the bearing can be run without clearance between it and the shaft. Also, any wear in the bearing is compensated for automatically.

The elastomeric crown 4 is generally cylindrical and has an inner surface and an outer surface 20, these surfaces being joined by a first end face 13 and a second end face 14. Each of the end faces is formed with a shoulder 17 to form a recess 21 on each side of the elastomeric crown 4. The recesses 21 define an inner portion 9 of the elastomeric crown.

The bearing 3 is provided with two flanges 6, 7 which extend radially outward. The flanges 6, 7 embrace the inner portion 9 of the elastomeric crown 4 to prevent relative axial movement of the crown and the bearing occurring during use of the bearing assembly. The recesses 21 are of sufficient depth such that in use the flanges 6, 7 of the bearing sit comfortably within the recesses 21, and do not extend beyond the planes of the first and second end faces 13, 14 of the elastomeric crown. Relative rotational movement of the bearing 3 and the elastomeric crown 4 is prevented due to the high level of friction between the two parts.

The elastomeric crown 4 is also provided with a plurality of passageways 11 The plurality of passageways 11 are formed in the elastomeric crown as part of the manufacture of the elastomeric crown 4 by moulding. In the embodiment illustrated in FIG. 1 there are twelve such passageways. Each of the passageways 11 extend from the first end face 13 of the elastomeric crown to the second end face 14. In the embodiment shown, each of the passageways has a longitudinal axis 12 extending substantially parallel to a longitudinal axis 10 of the elastomeric crown. Each of the passageways 11 is located between the inner portion of the crown extending between the flanges 6, 7 and an outer surface 20 of the elastomeric crown. More precisely, the axis 12 of each passageway 11 is located radially within the start of the shoulder 17 forming the recess 21 in each end face 13, 14. Each of the passageways 11 is located in order that in use the passageway is located radially outward of the flanges 6, 7 of the bearing 3.

Each of the passageways is of substantially uniform cross-section along its width. In the embodiment shown, each of the passageways is of generally circular cross-section when the elastomeric crown is in an unstressed condition. Each of the passageways 11 is located circumferentially equidistantly from one another. Dividing the crown axially into accurate portions defined by those portions that contain a passageway and those that do not contain a passageway, it can be seen that in this embodiment, such portions are equal to one another.

The elastomeric crown 4 is further provided with a plurality of ribs 15 located about the periphery of the outer surface 20 of elastomeric crown 4. Each of the plurality of ribs runs from the first end face 13 of the elastomeric crown 4 to the second end face 14. Each of the plurality of ribs terminates at each end face 13, 14 of the elastomeric crown 4 with a bevelled or sloping surface 18 (the inner surface of the housing 62 on the right side of FIG. 2 is omitted in the region of the rib 15 so as to show the protruding surface 16 and the bevelled or sloping end. portions 18). In this embodiment the upper surface of each of the plurality of ribs terminates in a flat surface 16. The flat surface is substantially parallel to a tangent 19 to the imaginary circular surface 20 of the elastomeric crown 4 formed at that point.

In the embodiment shown, each of the plurality of ribs extend substantially parallel to each of the plurality of passageways 11 through the elastomeric crown 4, that is they also extend substantially parallel to the longitudinal axis 10 of the elastomeric crown 4. In this embodiment, the midpoints of each of the flat surfaces 16 in the circumferential direction and the axis 12 of the passageways 11 both lie substantially on a common radial plane 50 passing through the axis 52 of the bearing 3 and bearing assembly 1.

Figure 3:
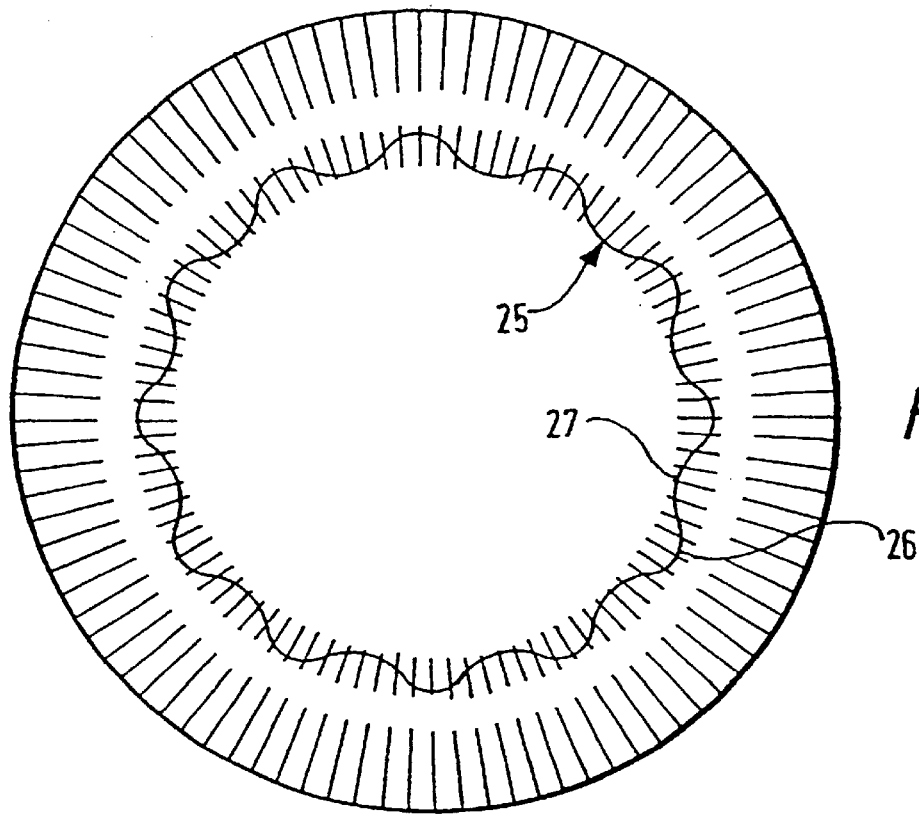
FIG. 3 shows diagrammatically the contact pressure at an inner surface of an elastomeric element in a first embodiment of the present invention.

The effect of the plurality of passageways 11 in the elastomeric crown on the contact pressure of the elastomeric crown 4 on the bearing 3 at the inner surface of the elastomeric crown due to interference between the elastomeric crown and the bearing is shown diagrammatically in FIG. 3. A line 25 indicates pressure levels around the inner surface of the elastomeric crown, with a first point 26 corresponding to a minimum value of the pressure and a second point 27 corresponding to a maximum value of the pressure. The higher pressure field is located in front of the solid portions of the elastomeric crown 4 and the lower pressure fields are located in front of the plurality of passageways 11.

Figure 4:
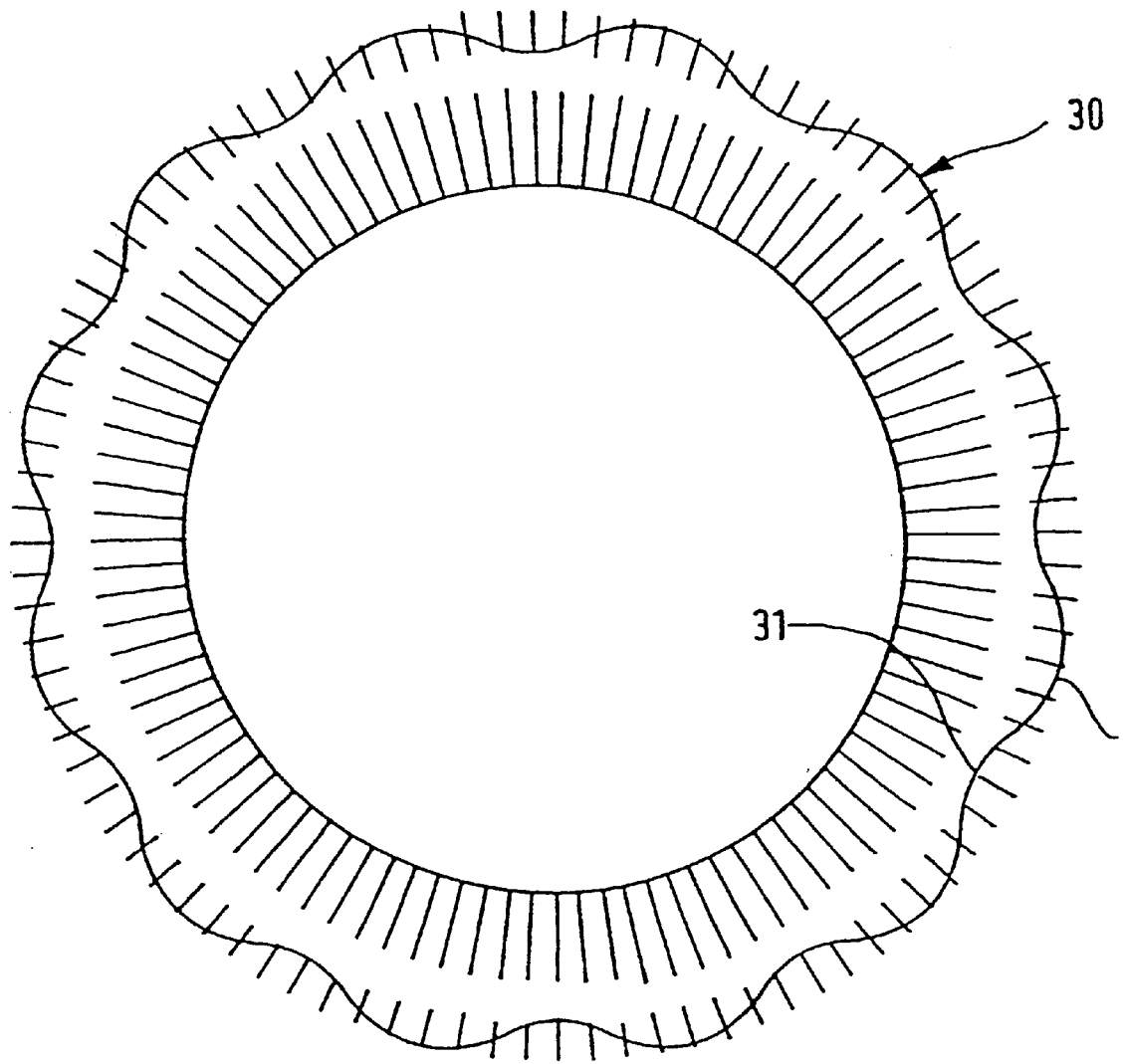
FIG. 4 shows diagrammatically the contact pressure at an outer surface of an elastomeric element in a first embodiment of the present invention.

FIG. 4 shows diagrammatically the contact pressure at the outer surface of the elastomeric crown due to interference between the outer surface of the elastomeric crown 4 and the inner surface of a housing (not shown). This Figure illustrates the effect of the plurality of ribs on this contact pressure. The level of contact pressure is represented by a line 30 on which a first point 31 represents a minimum contact pressure and a second point 32 represents a maximum contact pressure. The higher pressure fields are located in the region of each of the plurality of ribs 15 and the lower pressure fields are located in the regions between each of the plurality of ribs. It is the purpose of the ribs 15 to reduce the effects caused by any imperfections in the inner surface of the housing.

When the effects illustrated in FIGS. 3 and 4 are combined, it will be understood that the pressure variations introduced by the plurality of passageways 11 through the elastomeric crown 4 are partially offset by the plurality of ribs 15.

Thus, while providing sufficient force to act to close the axial split, the elastomeric crown decreases the stress level in the bearing to avoid or substantially eliminate the occurrence of undesirable creep bending in the elastomeric crown. Also, the variations between a minimum and a maximum pressure level will tend to reduce the effect of imperfections in the inside surface of the housing on the performance of the bearing assembly.

Other numbers of passageways 11 in the elastomeric crown 4 are also possible; for example an elastomeric crown can be produced with a plurality of passageways comprising six passageways, and a plurality of ribs comprising six ribs. The effect in the contact pressures at the inner and outer surfaces if the elastomeric crown in such an embodiment can be seen in FIGS. 5 and 6.

Figure 5:
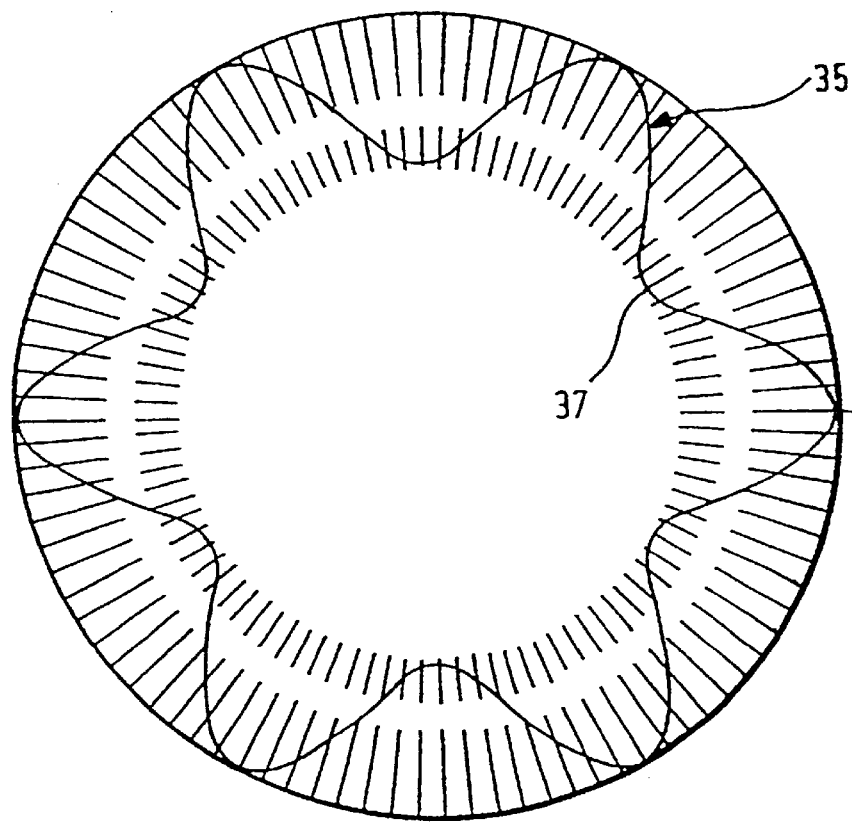
FIG. 5 shows diagrammatically the contact pressure at an inner surface of the elastomeric element in a second embodiment of the present invention.

In FIG. 5, a line 35 represents the contact pressure at the inner surface of the elastomeric crown due to the interference fit, on which a first point 36 represents a minimum contact pressure and a second point 37 represents a maximum contact pressure. It will be seen that the difference between the minimum contact pressure and the maximum contact pressure is greater in this embodiment than in the previous embodiment.

Figure 6:
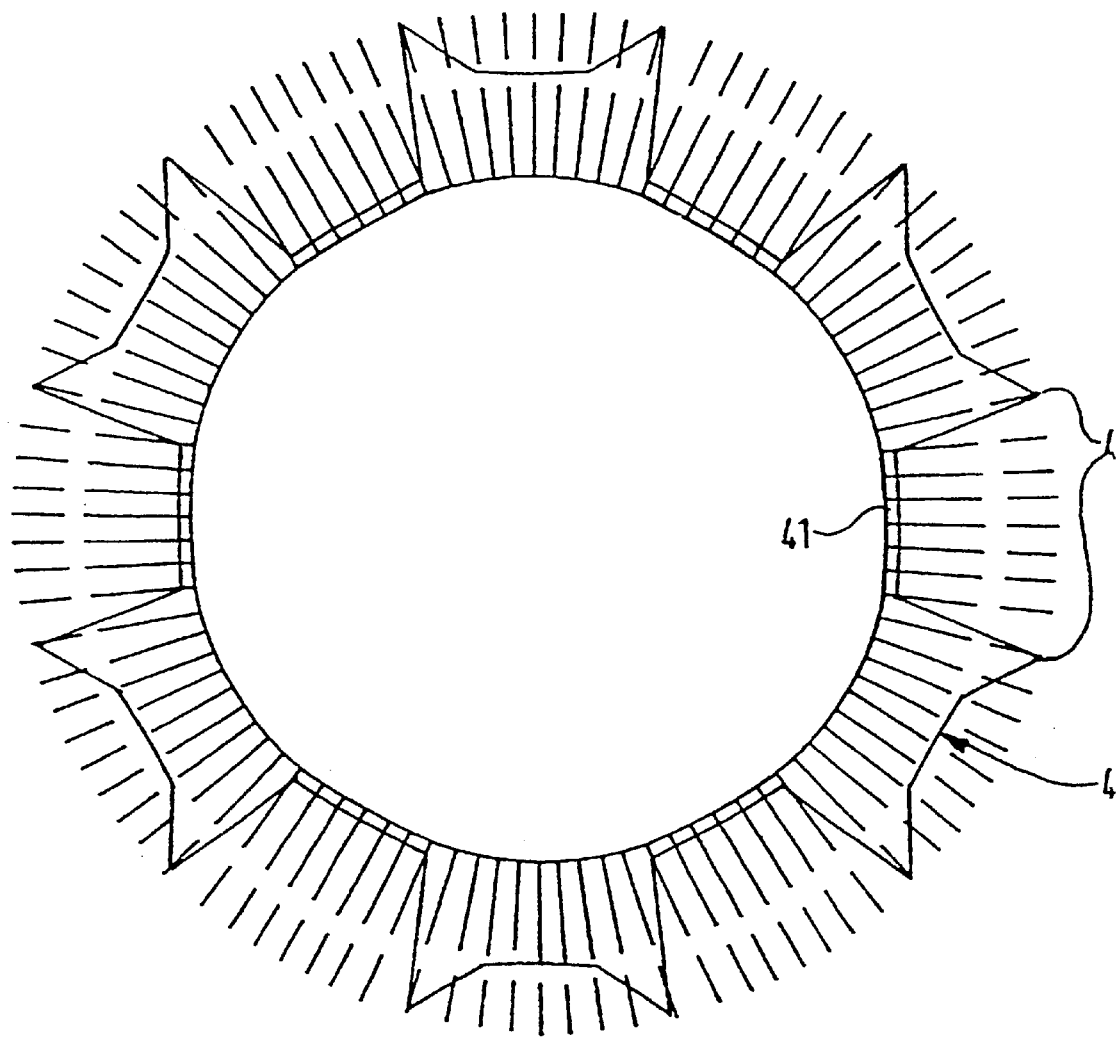
FIG. 6 which shows diagrammatically the contact pressure at an outer surface of the elastomeric element of the second embodiment of the present invention.

In FIG. 6, a line 40 represents the contact pressure at the outer surface of the elastomeric crown due to the interference fit, on which a first point 41 represents a maximum contact pressure and the points 42 represent minimum contact pressures. It can be seen in such an embodiment in which the arcuate portions of the crown containing one of the plurality of passageways are evenly distributed with those arcuate portions of the crown not containing one of the plurality of passageways, that the plurality of ribs are not able to fully to compensate for the effect of the plurality of passageways. In particular, it can be seen that the maximum contact pressure levels at the outer surface of the elastomeric crown correspond to the circumferentially outermost parts of each of the flat-topped ribs, and that a reduced pressure level exists between the edges of each of the ribs. While this embodiment gives adequate performance, the previous embodiment is to be preferred because of the lower difference between the minimum and maximum pressure fields, and because of the lower overall stress levels generated in the elastomeric crown. The reduction of the gap between the minimum and maximum pressure levels is desirable since the variation between the two leads to variations in the rotating torque value. It has been found that in use the first embodiment allows low torque variations of the steering column axis.

What is claimed is:

1. A bearing assembly comprising a cylindrical bearing having an axial split and an elastomeric crown located about the split bearing, the elastomeric crown including an elastomeric cylinder having an annular wall about a longitudinal axis, a plurality of passageways extending longitudinally through the cylinder wall, and a plurality of ribs extending along an outer surface of the elastomeric element, the cylindrical bearing including two flanges that embrace an inner portion of the elastomeric crown.

2. A bearing assembly according to claim 1, wherein the cylindrical bearing operates without clearance against a co-operating shaft.

3. A bearing assembly according to claim 1, wherein the inner surface of the bearing is lined with an anti-friction material.

4. A bearing assembly comprising a cylindrical bearing having an axial split and an elastomeric crown located about the split bearing, wherein the cylindrical bearing is a flanged bush.

5. A bearing assembly according to claim 4, wherein the cylindrical bearing operates without clearance against a co-operating shaft.

6. A bearing assembly according to claim 4, wherein the inner surface of the bearing is lined with an anti-friction material.

7. A bearing assembly according to claim 4, wherein the elastomeric crown comprises an elastomeric cylinder having an annular wall about a longitudinal axis, a plurality of passageways extending longitudinally through the cylinder wall, and a plurality of ribs extending along an outer surface of the elastomeric element.

8. A bearing assembly according to claim 7, wherein the passageways extend substantially parallel to the longitudinal axis of the elastomeric element.

9. A bearing assembly according to claim 7, wherein the plurality of ribs extend substantially parallel to the longitudinal axis of the elastomeric element.

10. A bearing assembly according to claim 7, wherein the plurality of ribs are located radially outwardly of the passageways.

11. A bearing assembly according to claim 7, wherein at least one rib comprises a bead extending longitudinally along the elastomeric cylinder, said bead projecting from the outer surface of the elastomeric cylinder, the outer surface of the bead being a flat formed parallel to a tangent of the outer surface of the elastomeric cylinder.

12. A bearing assembly according to claim 7, wherein the passageways are of circular cross section.

13. An elastomeric crown for a bearing assembly comprising an elastomeric cylinder having an annular wall about a longitudinal axis, a plurality of passageways extending longitudinally through the cylinder wall, and a plurality of ribs extending along an outer surface of the elastomeric element.

14. An elastomeric crown according to claim 13, wherein the passageways extend substantially parallel to the longitudinal axis of the elastomeric element.

15. An elastomeric crown according to claim 13, wherein the plurality of ribs extend substantially parallel to the longitudinal axis of the elastomeric element.

16. An elastomeric crown according to claim 13, wherein the plurality of ribs are located radially outwardly of the passageways.

17. An elastomeric crown according to claim 13, wherein at least one rib comprises a bead extending longitudinally along the elastomeric cylinder, the bead projecting from the outer surface of the elastomeric cylinder, the outer surface of the bead being a flat formed parallel to a tangent of the outer surface of the elastomeric cylinder.

18. An elastomeric crown according to claim 13, wherein the passageways are of circular cross section.

19. An elastomeric crown according to claim 13, wherein a mid-point of the ribs in the circumferential direction is contained in a radially directed plane which also includes the axis of a passageway.

20. An elastomeric crown according to claim 13, wherein the passageways are located circumferentially equidistantly from one another.

* * * * *